L. SAVARY-CARLIER.
APPARATUS FOR PURIFYING WATER FOR STEAM BOILERS AND THE LIKE.
APPLICATION FILED JUNE 26, 1911.

1,413,937.

Patented Apr. 25, 1922.
2 SHEETS—SHEET 1.

WITNESSES
Arthur S. Pettit
John C. Sanders

INVENTOR
Léonce Savary-Carlier
BY
ATTY.

L. SAVARY-CARLIER.
APPARATUS FOR PURIFYING WATER FOR STEAM BOILERS AND THE LIKE.
APPLICATION FILED JUNE 26, 1911.

1,413,937.

Patented Apr. 25, 1922.
2 SHEETS—SHEET 2.

WITNESSES:
Arthur S. Pettit
John C. Sanders

INVENTOR
Léonce Savary-Carlier
BY
ATTY

UNITED STATES PATENT OFFICE.

LÉONCE SAVARY-CARLIER, OF BAPAUME, FRANCE.

APPARATUS FOR PURIFYING WATER FOR STEAM BOILERS AND THE LIKE.

1,413,937.　　　　　Specification of Letters Patent.　Patented Apr. 25, 1922.

Application filed June 26, 1911. Serial No. 635,304.

(GRANTED UNDER THE PROVISIONS OF THE ACT OF MARCH 3, 1921, 41 STAT. L., 1313.)

*To all whom it may concern:*

Be it known that I, LÉONCE SAVARY-CARLIER, a citizen of France, residing at 76 Faubourg de Péronne, Bapaume, Pas-de-Calais, in the Republic of France, have invented new and useful Improvements in Apparatus for Purifying Water for Steam Boilers and the like, (for which I have filed applications in England June 29, 1911, Patent No. 15,229; in France June 8, 1911, Patent No. 430,705; in Germany Mar. 6, 1912, Patent No. 259,416; in Switzerland June 23, 1911, Patent No. 56,220; in Austria June 28, 1911, Patent No. 63,372, and in Holland June 4, 1912, Patent No. 136,) of which the following is a specification.

This invention relates to apparatus for the purification of water to be used in steam boilers and the like.

The invention has for object improved apparatus for this purpose in which steam, either live steam or exhaust steam, is caused to act upon the water to be purified inside a vertical or approximately vertical pipe closed at the bottom in such a manner as to oblige the two fluids to rise in this pipe as a rising column, forming therein a sort of emulsion.

By this means, the lime stone particles and other foreign bodies contained in the water collect and stick together to form spongy lumps soaked with water, which adhere to the walls of the apparatus and free themselves therefrom when their weight is sufficient. These lumps are prevented from hardening by the water which they contain, which facilitates the cleaning of the purifier. These lumps have now lost the property of forming again with the water the intimate mixture that existed before the separation, so that the water thus purified and drawn off is completely freed from the limestone and other foreign bodies originally held in suspension therein.

The improved apparatus is constituted of a cylindric reservoir surmounted by a column formed of superposed headers divided by a partition provided in each header into two vertical ducts which communicate with each other at the top, one being closed at the bottom whilst the other leads into the reservoir. The water is led into the first duct through a perforated plate and the steam is introduced therein at a level below the plate, the mixture of water and steam rising in a column in the duct where the purification is effected, whilst the purified water comes down again through the other duct into the reservoir at the bottom, where it deposits the foreign bodies carried along by it.

One constructional form of the improved apparatus is illustrated by way of example in the accompanying drawings.

Figure 1:
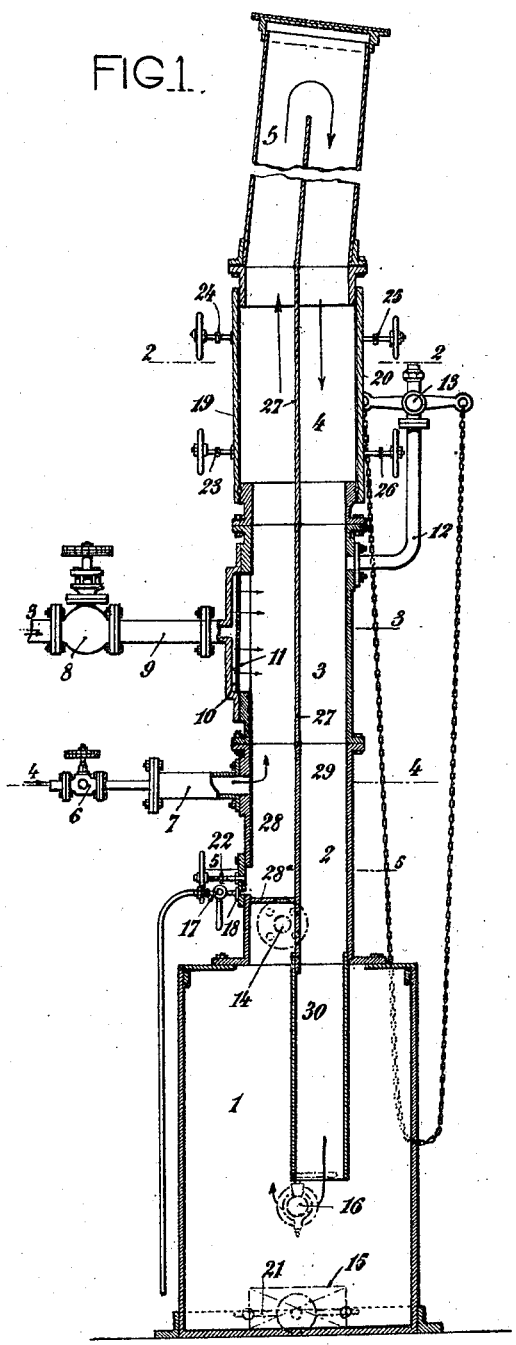
Fig. 1 is a vertical section partly in elevation.
Figure 6:
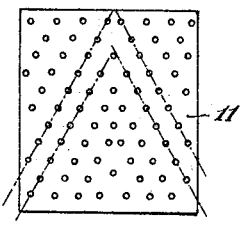
Fig. 6 is a detail showing the perforated plate through which the water enters the apparatus.
Figure 2:
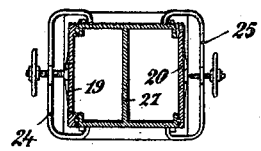
Figs. 2, 3, 4, 5, are transverse sections taken approximately according to the corresponding lines in Fig. 1.
Figure 3:
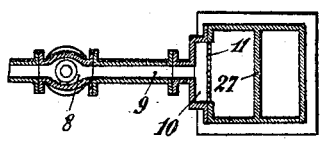
Figure 4:
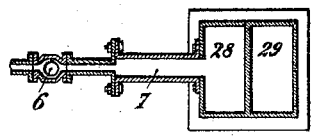
Figure 5:
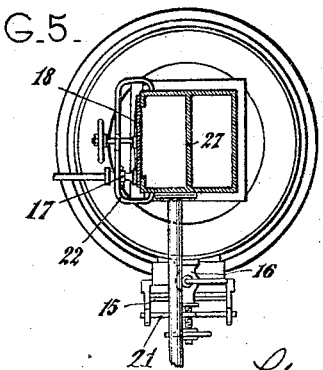

In the drawing the apparatus comprises a cylindric sheet metal reservoir 1, surmounted by three superposed headers, 2, 3, 4, held together by flanges and bolts.

On the header 4 is fixed a header 5 of of strong sheet metal and which is slightly inclined and closed at the top. Each header is provided with a vertical partition, which when the headers are superposed forms a single partition 27 dividing the column formed by the headers into two vertical ducts 28, 29. The partition 27 not extending quite to the top of the header 5, the two ducts are in communication at the top; the partition of the header 5 has the same inclination as this header itself. By means of this inclination, the mixture of water and steam on arriving at the top of the ascending duct 28 flows over the upper edge of the partition 27 and falls into the descending duct 29 in the form of a rain which is thoroughly mixed with the steam in the descending duct, instead of running down the wall of the descending duct as would be the case if the upper part of the partition 27 were upright. Moreover the line separated falls thus along the axis of the descending duct instead of descending along the wall of the descending duct and adhering upon the same. The duct or chamber 28 is closed at the bottom end by a horizontal partition 28$^a$, whilst the duct 29 is prolonged at its lower end into the inside of the reservoir 1 by means of a pipe 30 which reaches to within a certain distance of the bottom of the reservoir.

A pipe 7 leads into the duct 28, which pipe is for leading the steam (live or exhaust)

into the apparatus and is provided with a stop valve 6 which can be controlled by means of a hand wheel. A pipe 9 leads the water to be purified into the duct 28 at a level somewhat above that of the steam pipe 7. The pipe 9 has a stop valve 8 controlled like the valve 6 and the pipe leads into a chamber 10 in the side of the header 3 and separated from the duct 28 by a vertical plate 11 perforated with very small holes arranged preferably so as to be as little as possible in alignment in the vertical direction.

The header 3 carries a pipe 12 at the side of the chamber or duct 29, which pipe is bent into the vertical and is provided with a cock 13 which can be actuated by a lever and a chain. A pipe 14 carried by the header 2 serves for the take off of the purified water. A man-hole 15 in the reservoir 1, enables the pieces of line stone and other material deposited on the bottom of the reservoir 1, to be rendered accessible for removal. A discharge cock 16 is provided for discharging the water from the reservoir 1 when cleaning. A drain cock 17 to which is attached a discharge pipe, is provided for emptying the duct 28. The header 2 may be cleaned by means of a man-hole 18. and the header 4 by means of two hinged doors 19, 20. The stirrups 21 to 26 provided with hand wheels and jack screws ensure hermetic closing of the man-holes 15, 18 and the doors 19, 20. The general arrangement of the headers and their man-holes and doors renders the apparatus easy to assemble and clean.

The hereinbefore described purifier operates in the following manner:

To start the purifier, steam is admitted to the duct 7 by opening the stop valve 6 to a point indicated on the graduated hand wheel. The steam enters the lower part of the header 2 in which it gradually expands. It then rises successively into the chamber 28 of the headers 2, 3 and 4, and arrives at the top of the header 5 which is in communication with the chamber 29. The steam then descends from the header 5 to the header 4, and thence to the header 3, from which it can escape by the pipe 12 and the cock 13 which is opened for this purpose. When the steam issues strongly from the cock 13, the water to be purified is admitted to the atomizing chamber 10. For this purpose the stop 8 is gradually opened and the water then passes through the perforated plate 11 from which it is projected as a fine rain into the duct 28 of the header 2 at a position slightly above the steam inlet.

The foreign bodies are thus separated from the water and collect in spongy lumps on the walls of the duct 28. Thereafter the purified water mixed with steam rises towards the top of the header 5 whence it passes from the ascending duct 28 into the descending duct 29, from which it flows through the pipe 30 to the bottom of the reservoir 1.

When the apparatus has beeen working for some time the pieces of lime stone and other materials which collect on the walls of the ascending duct become sufficiently large and free themselves owing to their own weight, whereby they are carried along by the column of water and steam to the bottom of the reservoir 1, where they are deposited. When the deposits in the reservoir attain the height of the cock 16 they are withdrawn through the man-hole 15.

To properly regulate the working of the apparatus it is necessary to adjust the water admitted to suit the steam, which is effected with great ease by means of numbered indications on the hand wheel of the valves 6 and 8. In this manner the desired volume of purified water can be obtained. When the regulation is thus effected a slight cloud of steam should be observed issuing from the cock 13 and at this instant this cock is closed when the apparatus will work automatically without any supervision and without fear of the degree of purification changing.

To stop the operation of the apparatus the regulating cock 13 is first opened, the steam and water admission valve being then gradually closed until they are completely shut down. The drain cock 17 is then opened to enable the working water column to be discharged from the purifying duct 28.

Various modifications in detail may obviously be introduced into the hereinbefore described construction of the apparatus without exceeding the scope of the invention.

Having now described my invention what I claim as new and desire to secure by Letters Patent is:

1. In apparatus for purifying water, a reservoir, a column formed of superposed headers, this column being mounted on the reservoir and closed at the top, a partition in each header arranged to divide the column into an ascending duct and a descending duct, means for closing the ascending duct at the bottom end, means for interconnecting the two ducts at their upper ends, means for connecting the descending duct to the reservoir and means for suppyling the water to be purified and the steam at the lower end of the ascending duct.

2. In water purifying apparatus, a reservoir, a column formed of superposed and connected headers this column being mounted on the reservoir and closed at the top, a partition in each header arranged to divide the column into an ascending duct and a descending duct, means for closing the ascending duct at its bottom end, means for interconnecting the two ducts at their upper ends, means for connecting the descending duct to the reservoir, means for supplying steam to the lower end of the ascending duct, a perforated plate mounted in the wall of this duct above the steam inlet and means for admitting the water to be purified to the duct through this perforated plate.

3. In water purifying apparatus, a reservoir, a column formed of superposed and connected headers this column being mounted on the reservoir, a partition in each header arranged to divide the column into an ascending and a descending duct, the top header and its partition being slightly inclined, means for closing the ascending duct at its bottom end, means for interconnecting the two ducts at their upper ends, means for connecting the descending duct to the reservoir, and means for supplying the water to be purified and steam to the lower end of the ascending duct.

4. In apparatus for purifying water, a reservoir, a column formed of superposed and connected headers this column being mounted on the reservoir and closed at the top, a partition in each header arranged to divide the column into an ascending duct and a descending duct, means for closing the ascending duct at its bottom end, means for interconnecting the two ducts at their upper ends, means for connecting the descending duct to the reservoir, means for supplying the water to be purified and the steam to the lower end of the ascending duct, and means for connecting at will and regulably the descending duct with the atmosphere.

In testimony whereof I have signed my name to this specification in the presence of two subscribing witnesses.

LÉONCE SAVARY-CARLIER.

Witnesses:
 Louis Moses,
 Dean B. Mason.